United States Patent
Hengst et al.

(10) Patent No.: US 10,801,384 B2
(45) Date of Patent: Oct. 13, 2020

(54) DIESEL OXIDATION CATALYST CONTAINING MANGANESE

(71) Applicant: UMICORE AG & CO. KG, Hanau-Wolfgang (DE)

(72) Inventors: Christoph Hengst, Butzbach (DE); Naohiro Kato, Hyogo (JP)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 16/490,968

(22) PCT Filed: Mar. 6, 2018

(86) PCT No.: PCT/EP2018/055388
§ 371 (c)(1),
(2) Date: Sep. 4, 2019

(87) PCT Pub. No.: WO2018/162434
PCT Pub. Date: Sep. 13, 2018

(65) Prior Publication Data
US 2020/0025051 A1  Jan. 23, 2020

(30) Foreign Application Priority Data
Mar. 6, 2017 (EP) .................................. 17159286

(51) Int. Cl.
| | |
|---|---|
| *F01N 3/20* | (2006.01) |
| *B01J 21/06* | (2006.01) |
| *B01J 21/08* | (2006.01) |
| *B01J 21/12* | (2006.01) |
| *B01J 23/44* | (2006.01) |
| *B01J 23/656* | (2006.01) |
| *B01J 29/08* | (2006.01) |
| *B01J 29/40* | (2006.01) |
| *B01J 29/70* | (2006.01) |
| *B01J 35/02* | (2006.01) |
| *B01J 35/04* | (2006.01) |
| *B01J 35/10* | (2006.01) |
| *B01J 37/02* | (2006.01) |

(52) U.S. Cl.
CPC .......... *F01N 3/2066* (2013.01); *B01J 21/063* (2013.01); *B01J 21/08* (2013.01); *B01J 21/12* (2013.01); *B01J 23/44* (2013.01); *B01J 23/6562* (2013.01); *B01J 29/084* (2013.01); *B01J 29/40* (2013.01); *B01J 29/7007* (2013.01); *B01J 35/023* (2013.01); *B01J 35/04* (2013.01); *B01J 35/1019* (2013.01); *B01J 37/0201* (2013.01); *B01J 37/0244* (2013.01); *B01J 37/0246* (2013.01); *B01J 37/0248* (2013.01); *F01N 2370/04* (2013.01)

(58) Field of Classification Search
CPC .... F01N 3/2066; F01N 2370/04; B01J 21/08; B01J 23/44; B01J 21/063; B01J 35/023

USPC ........................................ 422/168; 423/213.5
See application file for complete search history.

(56) References Cited

U.S. PATENT DOCUMENTS

| | | | |
|---|---|---|---|
| 5,120,695 A * | 6/1992 | Blumrich | ........... B01D 53/8643 |
| | | | 502/78 |
| 5,260,248 A | 11/1993 | Singh et al. | |
| 5,643,542 A | 7/1997 | Leyrer et al. | |
| 6,602,820 B1 | 8/2003 | Göbel et al. | |
| 8,057,767 B1 | 11/2011 | Qi et al. | |
| 8,959,894 B2 | 2/2015 | Qi et al. | |
| 10,035,134 B2 | 7/2018 | Dornhaus et al. | |
| 2007/0134145 A1* | 6/2007 | Strehlau | .................. B01J 29/072 |
| | | | 423/213.5 |
| 2009/0193796 A1* | 8/2009 | Wei | ...................... F01N 13/0097 |
| | | | 60/297 |
| 2010/0152032 A1 | 6/2010 | Galligan | |
| 2013/0156668 A1* | 6/2013 | Spurk | ...................... B01J 23/10 |
| | | | 423/213.2 |
| 2015/0165422 A1* | 6/2015 | Sung | .................... B01J 35/0006 |
| | | | 423/213.5 |
| 2015/0165423 A1 | 6/2015 | Sung et al. | |
| 2017/0120192 A1* | 5/2017 | Brown | ................. B01J 35/1019 |

FOREIGN PATENT DOCUMENTS

| | | |
|---|---|---|
| DE | 10 2011 109 200 A1 | 2/2012 |
| DE | 10 2012 204 524 A1 | 10/2012 |
| EP | 1 101 528 A2 | 5/2001 |

(Continued)

OTHER PUBLICATIONS

International Search Report for PCT/EP2018/055388, dated May 30, 2018 (6 pgs. with English translation).

(Continued)

*Primary Examiner* — Tom P Duong
(74) *Attorney, Agent, or Firm* — Smith, Gambrell & Russell, LLP

(57) ABSTRACT

The present invention relates to a diesel oxidation catalyst, which comprises a carrier body having a length L extending between a first end face a and a second end face b and a catalytically active material zone A arranged on the carrier body, wherein the material zone A contains palladium and platinum on a manganese-containing carrier oxide, wherein the carrier oxide consists of a carrier oxide component A and a carrier oxide component B and the carrier oxide component B consists of manganese and/or a manganese compound and is present in an amount of 5 to 15 wt. %, calculated as $MnO_2$ and based on the total weight of the manganese-containing carrier oxide.

19 Claims, 3 Drawing Sheets

(56) References Cited

FOREIGN PATENT DOCUMENTS

| EP | 2 000 639 A1 | 12/2008 |
|---|---|---|
| WO | 2014/ 080220 A1 | 5/2014 |
| WO | 2015/095056 A1 | 6/2015 |
| WO | 2015/095058 A1 | 6/2015 |
| WO | 2016/038074 A1 | 3/2016 |

OTHER PUBLICATIONS

Written Opinion of the International Searching Authority for PCT/EP2018/055388, dated May 30, 2018 (5pgs.).

S.A. Yashnik, et al. High-Performance Mn—Al—O Catalyst on Reticulated Foam Materials for Environmentally Friendly Catalytic Combustion. Eurasian Chemico-Technological Journal 17 (2015) 145-158.

Weiwei Zhao, et al. Iron lanthum and Manganese Oxides Loaded on $\gamma$-$Al_2O_3$ for Selective Catalytic Reduction of NO with $NH_3$ at Low Temperature. Environmental Technology, vol. 34, No. 1 Jan. 2013, 81-90.

* cited by examiner

DIESEL OXIDATION CATALYST CONTAINING MANGANESE

The present invention relates to a manganese-containing oxidation catalyst for purifying the exhaust gases of diesel engines.

In addition to carbon monoxide CO, hydrocarbons HC and nitrogen oxides $NO_x$, the raw exhaust of diesel engines contains a relatively high oxygen content of up to 15% by volume. Additionally, particulate emissions are included which predominantly consist of soot residues and in some cases organic agglomerates and result from a partially incomplete combustion of fuel in the cylinder.

While diesel particulate filters with and without catalytically active coating are suitable for removing the particle emissions, and nitrogen oxides can be converted to nitrogen, for example, by selective catalytic reduction (SCR) in a so-called SCR catalyst, carbon monoxide and hydrocarbons are rendered harmless by oxidation in a suitable oxidation catalyst. In addition, oxidation catalysts often have the task of setting an optimum ratio of NO to $NO_2$ for an outflow-side SCR catalyst.

Oxidation catalysts are extensively described in the literature. These are, for example, so-called flow-through substrates made of ceramic or metal, which carry as essential catalytically active constituents noble metals, such as platinum and palladium, on large-surface-area, porous, high-melting-point oxides, aluminum oxide, for example.

EP2000639A1 describes oxidation catalysts which contain, in addition to platinum, an oxide of a metal selected from magnesium, alkaline earth metal and alkali metal. The function of the catalyst is to increase the exhaust gas temperature during a fuel injection.

Even if modern diesel fuels have a low sulfur content, care must be taken to ensure that diesel oxidation catalysts have a high insensitivity to sulfur compounds over the entire lifetime.

The use of manganese oxide ($MnO_2$) for controlling sulfur emissions is known from WO2014/080220. Manganese oxide and noble metal are applied thereby to a filter substrate in a coating.

Using manganese compounds, in particular manganese oxide, as constituents of catalysts for the catalysis of automotive exhaust gases is also already known from DE 102011109200A1.

DE102012204524A1 describes LNT catalysts containing manganiferous mixed oxides, e.g., $MnO_x$—$CeO_2$. US2013/336865 also describes $NO_x$ absorber catalysts containing manganese. WO 2015/095056 A1 and WO 2015/095058 A1 describe catalysts comprising a plurality of catalytically active layers, one of these layers containing a manganese-containing carrier oxide for a platinum and optionally a palladium component. In addition to the oxidation of hydrocarbon and carbon monoxide, the catalysts are also capable of oxidizing nitrogen monoxide to nitrogen dioxide.

The present invention relates to a diesel oxidation catalyst, which comprises a carrier body having a length L extending between a first end face a and a second end face b and a catalytically active material zone A arranged on the carrier body, wherein the material zone A contains palladium and platinum on a manganese-containing carrier oxide, wherein the manganese-containing carrier oxide consists of a carrier oxide component A and a carrier oxide component B and the carrier oxide component B consists of manganese and/or a manganese compound and is present in an amount of 5 to 15 wt. %, calculated as $MnO_2$ and based on the total weight of the manganese-containing carrier oxide.

Suitable carrier oxide components A are selected from the series consisting of aluminum oxide doped aluminum oxide, silicon oxide, titanium dioxide and mixed oxides containing one or more of said oxides.

Doped aluminum oxides are, for example, aluminum oxides doped with lanthanum oxide, silicon oxide, zirconium oxide and/or titanium oxide.

Lanthanum-doped aluminum oxide is advantageously used, wherein lanthanum is used in quantities of 1 to 10% by weight, preferably 3 to 6 wt. %, in each case calculated as $La_2O_3$ and based on the weight of the doped aluminum oxide.

A mixed oxide of aluminum oxide and silicon oxide or aluminum oxide doped with silicon oxide is also advantageously used.

The carrier oxide component A is in particular free of manganese and manganese compounds.

The carrier oxide component A is present in an amount of from 85 to 95 wt. %, calculated as oxide and based on the total weight of the manganese-containing carrier oxide.

The proportion of carrier oxide component B on the manganese-containing carrier oxide is according to the invention 5 to 15 wt. % manganese and/or manganese compound, calculated as $MnO_2$ and based on the total weight of the carrier oxide. Particularly preferred are 8 to 12 wt. %, for example 9, 10 or 11 wt. %.

In one embodiment of the present invention, the manganese-containing carrier oxide is designed such that the carrier oxide component A is doped with carrier oxide component B. Such a manganese-containing carrier oxide is obtained, for example, by adding a corresponding amount of a water-soluble manganese salt, for example manganese acetate, to carrier oxide component A and then drying and, if appropriate, calcining. Manganese is then present on the carrier oxide component A as a rule as manganese oxide, in particular as $MnO_2$. According to this method, it is particularly advantageous to dope a mixed oxide of aluminum oxide and silicon oxide or aluminum oxide doped with silicon oxide with manganese oxide.

In order to avoid misunderstandings, it is hereby made clear that the manganese-containing carrier oxide of the present invention does not comprise a physical mixture of carrier oxide component A and carrier oxide component B.

In embodiments of the present invention, material zone A is free of cerium oxide.

In embodiments of the present invention, material zone A is free of zeolites.

In embodiments of the present invention, the oxidation catalyst according to the invention is free of rare earth metals and rare earth metal compounds.

Material zone A contains according to the invention platinum and palladium as precious metals. The ratio of platinum to palladium is in particular Pt:Pd≥1, i.e., for example, 20:1 to 1:1. Preferred is the Pt:Pd ratio 10:1 to 2:1, for example 8:1, 6:1 or 4:1.

The amounts of palladium and platinum present in the oxidation catalyst according to the invention can vary within wide limits and depend on the exact function the oxidation catalyst according to the invention is intended to fulfill. The person skilled in the art can determine the required amounts in a simple manner.

In embodiments of the oxidation catalyst according to the invention, the platinum and palladium in material zone A is supported exclusively on the manganese-containing carrier oxide.

In embodiments of the oxidation catalyst according to the invention, material zone A is the sole catalytically active material zone.

In embodiments of the oxidation catalyst according to the invention, material zone A is the sole material zone. In this case, the oxidation catalyst according to the invention consists of a carrier body having a length L extending between a first end face a and a second end face b and of the catalytically active material zone A arranged on the carrier body.

In embodiments of the oxidation catalyst according to the invention, the material zone A is present in amounts of from 50 to 150 g/l, based on the volume of the carrier body.

In embodiments of the oxidation catalyst according to the invention, the material zone A extends over the entire length L of the carrier body. However, in embodiments in which the carrier body comprises, in addition to material zone A, one or more other catalytically active or inert material zones, the length of material zone A may also be shorter than the length L, that is to say approximately 10 to 90, 20 to 70%, 40 to 60% or 45 to 50% of the total length L of the carrier body. In these cases, the material zone A can originate either from end face a or from end face b. In one embodiment of the present invention, the oxidation catalyst according to the invention comprises, in addition to the material zone A, a material zone B. It is preferred thereby for the material zone B to lie directly on the carrier body, in particular over its entire length L, and the material zone A on material zone B.

Material zone B generally comprises noble metal, in particular platinum, palladium or platinum and palladium, on a carrier oxide selected from the series consisting of aluminum oxide doped aluminum oxide, silicon oxide, titanium dioxide and mixed oxides containing one or more of said oxides.

In addition, material zone B may also contain zeolite, which is selected in particular from the series consisting of beta zeolite, ZSM-5, zeolite Y or mixtures thereof.

If material zone B contains platinum and palladium, its weight ratio may vary within wide limits. In particular, the weight ratio of platinum to palladium is Pt:Pd≥1, i.e., for example, 20:1 to 1:1. Preferred is the Pt:Pd ratio 10:1 to 1.5:1, for example 8:1, 6:1 or 4:1.

So-called honeycomb bodies made of ceramic, in particular cordierite, or of metal are particularly suitable as carrier bodies. So-called flow-through honeycomb bodies are preferably used. However, embodiments are also conceivable in which wall-flow filters are used as carrier bodies.

Oxidation catalysts according to the invention can be produced by coating a suitable carrier body in a manner known per se by means of a coating suspension, a so-called washcoat. In order to produce a coating suspension for producing the material zone A, a suitable manganese-containing carrier oxide is suspended in water, for example. Platinum and palladium are then added to the suspension while stirring in the form of suitable, water-soluble precursor compounds, such as palladium nitrate or hexahydroxoplatinic acid, for example, and optionally fixed on the carrier material by setting the pH and/or by adding an auxiliary reagent. Alternatively, the noble metal may also be applied to the carrier material in a manner analogous to the method described in EP 1 101 528 A2.

The suspensions obtained in this way are then ground and applied to the carrier body by one of the standard coating methods. After the coating, the coated part is dried in a hot air stream and in some cases a calcination takes place.

The aforementioned precursor compounds and auxiliary reagents are well known to the person skilled in the art.

If, in addition to material zone A, further material zones, for example material zone B, are present, these are applied to the carrier body in basically the same manner and in the desired sequence.

The diesel oxidation catalysts according to the invention are suitable for purifying the exhaust gases of diesel engines, in particular with regard to carbon monoxide and hydrocarbons. Moreover, they are capable of oxidizing nitrogen monoxide to nitrogen dioxide and thus of adjusting an optimum ratio of nitrogen monoxide to nitrogen dioxide for an exhaust-side SCR catalyst.

The present invention thus also relates to a method for the treatment of diesel exhaust gases, characterized in that the diesel exhaust gas is conducted via a diesel oxidation catalyst as described and defined above.

The diesel oxidation catalysts according to the invention are used in particular as constituents of exhaust gas purification systems. In addition to a diesel oxidation catalyst according to the invention, corresponding exhaust gas purification systems include, for example, a diesel particulate filter and/or a catalyst for selective catalytic reduction of nitrogen oxides, wherein the diesel particulate filter and SCR catalyst are usually arranged downstream of the diesel oxidation catalyst according to the invention, that is on the outflow side. In one embodiment of the emission control system, the SCR catalyst is arranged on the diesel particulate filter.

The invention is explained in the following examples and figures.

Figure 1A:
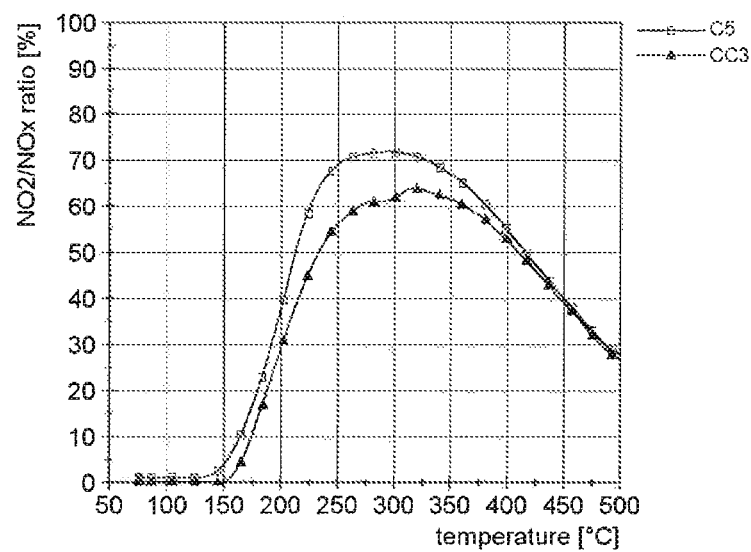
FIG. 1a shows the $NO_2/NO_x$ ratio of the C5 catalyst and the CC3 comparison catalyst measured by means of exhaust gas mixture III (10% $O_2$, 250 ppm CO, 750 ppm NO, 7.5% $H_2O$, 7% $CO_2$ and balance $N_2$) after aging at 650° C. for 16 hours.

EXAMPLE 1 a) A coating suspension was prepared, which contained 1.36 g/l platinum, 0.91 g/l palladium, 67.8 g/l of a silicon dioxide-doped aluminum oxide and 26.0 g/l beta zeolite, and was coated by means of a conventional method onto a commercially available cordierite flow-through honeycomb body.

b) 35 g/l of an aluminum oxide doped with lanthanum oxide and manganese oxide with a surface area of approx. 160 m$^2$/g was moistened with an aqueous solution containing 1.9 g/l platinum in the form of tetraammineplatinum acetate and 0.32 g/l palladium in the form of tetraamminepalladium acetate such that the pores of the aluminum oxide were filled but the powder remained free-flowing. The weight ratio of aluminum oxide, lanthanum oxide and manganese oxide in the doped aluminum oxide was 91:4:5. To fix the noble metal, the moist powder was dried at 120° C. for eight hours and calcined at 300° C. for 4 hours. The resulting powder was then suspended in water and ground to a particle size of $D_{90}$<20 micrometers.

c) The coating suspension obtained in step b) was coated onto the catalyst obtained in step a) by means of a conventional method.

The catalyst thus obtained is referred to below as C1.

EXAMPLE 2

Example 1 was repeated with the difference that an aluminum oxide doped with lanthanum oxide and manganese oxide and having a surface area of about 150 m$^2$/g and a weight ratio of aluminum oxide, lanthanum oxide and manganese oxide of 86:4:10 was used.

The catalyst thus obtained is referred to below as C2.

COMPARATIVE EXAMPLE 1

Example 1 was repeated with the difference that an aluminum oxide doped with lanthanum oxide and having a surface area of about 150 m$^2$/g and a weight ratio of aluminum oxide and lanthanum oxide of 96:4 was used.

The catalyst thus obtained is referred to below as CC1.

EXAMPLE 3

Example 1 was repeated with the difference that an aluminum oxide doped with silicon oxide and manganese oxide and having a surface area of about 180 m$^2$/g and a weight ratio of aluminum oxide, silicon oxide and manganese oxide of 90:5:5 was used.

The catalyst thus obtained is referred to below as C3.

EXAMPLE 4

Example 1 was repeated with the difference that an aluminum oxide doped with silicon oxide and manganese oxide and having a surface area of about 170 m$^2$/g and a weight ratio of aluminum oxide, silicon oxide and manganese oxide of 85:5:10 was used.

The catalyst thus obtained is referred to below as C4.

COMPARATIVE EXAMPLE 2

Example 1 was repeated with the difference that an aluminum oxide doped with silicon oxide and having a surface area of about 150 m$^2$/g and a weight ratio of aluminum oxide and silicon oxide of 95:5 was used.

The catalyst thus obtained is referred to below as CC2.

COMPARATIVE EXPERIMENTS I a) Cores were taken from the catalysts C1, C2, CC1, C3, C4 and CC2 and hydrothermally aged in an oven at 800° C. for 16 hours (10% $H_2O$, 10% $O_2$, balance $N_2$).

b) The CO $T_{50}$ value was determined by means of the extracted and aged cores. In addition, in a laboratory reactor an artificial exhaust gas comprising 6% $O_2$, 350 ppm CO, 270 ppm NO, 180 ppm $C_3H_6$, 90 ppm $C_3H_8$, 10% $H_2O$, 10% $CO_2$ and balance $N_2$ (exhaust gas mixture I) was conducted at 2000 L/h through the cores and the temperature with 15° C./min was increased from 75° C. to 500° C.t. In so doing, the temperature at which 50% of the carbon monoxide is reacted was determined.

The results can be taken from Table 1.

| | Proportion by weight of $MnO_2$ in the carrier oxide | CO $T_{50}$ [° C.] |
| --- | --- | --- |
| C1 | 5 | 125 |
| C2 | 10 | 121 |
| CC1 | 0 | 145 |
| C3 | 5 | 133 |
| C4 | 10 | 135 |
| CC2 | 0 | 141 |

EXAMPLE 5

A coating suspension was prepared, which contained 0.61 g/l platinum, 0.10 g/l palladium, 105.29 g/l of an aluminum oxide doped with silicon dioxide and manganese dioxide, and was coated by means of a conventional method onto a commercially available cordierite flow-through honeycomb body. The weight ratio of aluminum oxide, silicon oxide and manganese oxide in the doped aluminum oxide was 85:5:10.

The catalyst thus obtained is referred to below as C5.

COMPARATIVE EXAMPLE 3

Example 5 was repeated with the difference that an aluminum oxide doped with silicon oxide and having a surface area of about 150 m$^2$/g and a weight ratio of aluminum oxide and silicon oxide of 95:5 was used.

The catalyst thus obtained is referred to below as CC3.

EXAMPLE 6

Example 5 was repeated with the difference that an aluminum oxide doped with lanthanum oxide and manganese oxide and having a surface area of about 145 m$^2$/g and a weight ratio of aluminum oxide, lanthanum oxide and manganese oxide of 86:4:10 was used.

The catalyst thus obtained is referred to below as C6.

EXAMPLE 7

90 g/l of a lanthanum oxide-doped aluminum oxide having a surface area of about 170 m$^2$/g was moistened with an aqueous solution containing 10 g/l manganese oxide in the form of manganese acetate tetrahydrate in such a way that the pores of the aluminum oxide were filled but the powder remained free-flowing. The weight ratio of aluminum oxide, lanthanum oxide and manganese oxide in the doped alumina was 86.4:3.6:10. To fix the manganese (as manganese oxide), the moist powder was dried at 120° C. for eight hours and calcined at 300° C. for 4 hours. The resulting powder was then suspended in water and ground to a particle size of D90<20 micrometers.

A coating suspension containing 0.61 g/l platinum, 0.10 g/l palladium and 105.29 g/l of the aforementioned powder was prepared from the powder thus obtained and coated onto a commercially available cordierite flow-through honeycomb body by means of a conventional method.

The catalyst thus obtained is referred to below as C7.

COMPARATIVE EXAMPLE 4

Example 5 was repeated with the difference that an aluminum oxide doped with lanthanum oxide and having a surface area of about 190 m$^2$/g and a weight ratio of aluminum oxide and lanthanum oxide of 96:4 was used.

The catalyst thus obtained is referred to below as CC4.

EXAMPLE 8

95 g/l of a pure aluminum oxide with a surface area of approx. 140 m$^2$/g was moistened with an aqueous solution containing 5 g/l manganese oxide in the form of manganese acetate tetrahydrate such that the pores of the aluminum oxide were filled but the powder remained free-flowing. The weight ratio of aluminum oxide and manganese oxide in the doped aluminum oxide was 95:5. To fix the manganese (as manganese oxide), the moist powder was dried at 120° C. for eight hours and calcined at 300° C. for 4 hours. The resulting powder was then suspended in water and ground to a particle size of D90<20 micrometers.

A coating suspension containing 0.61 g/l platinum, 0.10 g/l palladium and 105.29 g/l of the aforementioned powder was prepared from the powder thus obtained and coated onto a commercially available cordierite flow-through honeycomb body by means of a conventional method.

The catalyst thus obtained is referred to below as C8.

EXAMPLE 9

90 g/l of a pure aluminum oxide with a surface area of approx. 140 m$^2$/g was moistened with an aqueous solution containing 10 g/l manganese oxide in the form of manganese acetate tetrahydrate such that the pores of the aluminum oxide were filled but the powder remained free-flowing. The weight ratio of aluminum oxide and manganese oxide in the doped aluminum oxide was 90:10. To fix the manganese (as manganese oxide), the moist powder was dried at 120° C. for eight hours and calcined at 300° C. for 4 hours. The resulting powder was then suspended in water and ground to a particle size of D90<20 micrometers.

A coating suspension containing 0.61 g/l platinum, 0.10 g/l palladium and 105.29 g/l of the aforementioned powder was prepared from the powder thus obtained and coated onto a commercially available cordierite flow-through honeycomb body by means of a conventional method.

The catalyst thus obtained is referred to below as C9.

COMPARATIVE EXAMPLE 5

Example 5 was repeated with the difference that a pure aluminum oxide having a surface area of about 140 m$^2$/g was used.

The catalyst thus obtained is referred to below as CC5.

COMPARATIVE EXPERIMENTS II a) Two cores were extracted from each of the catalysts C5, CC3, C6, C7, CC4, C8, C9 and CC5 and hydrothermally aged in an oven at 650° C. for 16 hours (10% H$_2$O, 10% O$_2$, balance N$_2$).

b) The CO T$_{50}$ value was determined by means of the extracted and aged cores. In addition, in a laboratory reactor an artificial exhaust gas comprising 6% O$_2$, 350 ppm CO, 270 ppm NO, 180 ppm C$_3$H$_6$, 90 ppm C$_3$H$_8$, 116 ppm H$_2$, 5% H$_2$O, 10.7% CO$_2$ and balance N$_2$ (exhaust gas mixture II) was conducted at 1930 L/h through the cores and the temperature with 15° C./min was increased from 75° C. to 500° C. In so doing, the temperature at which 50% of the carbon monoxide is reacted was determined.

c) In a further test the method according to b) was repeated, but with an artificial exhaust gas comprising 10% O$_2$, 250 ppm CO, 750 ppm NO, 7.5% H$_2$O, 7% CO$_2$ and balance N$_2$ (exhaust gas mixture III).

d) The comparative experiments according to a) and b) were repeated with cores aged for 16 hours at 750° C.

The results are shown in Tables 2 to 5.

TABLE 2

Aging 16 h 650° C., exhaust gas mixture II

| | Proportion by weight of MnO$_2$ in the carrier oxide | CO T$_{50}$ [° C.] |
|---|---|---|
| C5 | 10 | 142 |
| CC3 | 0 | 162 |
| C6 | 10 | 155 |
| C7 | 10 | 145 |
| CC4 | 0 | 172 |
| C8 | 5 | 154 |
| C9 | 10 | 150 |
| CC5 | 0 | 180 |

TABLE 3

Aging 16 h 750° C., exhaust gas mixture II

| | Proportion by weight of MnO$_2$ in the carrier oxide | CO T$_{50}$ [° C.] |
|---|---|---|
| C5 | 10 | 151 |
| CC3 | 0 | 168 |
| C6 | 10 | 164 |
| C7 | 10 | 162 |
| CC4 | 0 | 179 |
| C8 | 5 | 150 |
| C9 | 10 | 155 |
| CC5 | 0 | 188 |

TABLE 4

Aging 16 h 650° C., exhaust gas mixture III

| | Proportion by weight of MnO$_2$ in the carrier oxide | CO T$_{50}$ [° C.] |
|---|---|---|
| C5 | 10 | 119 |
| CC3 | 0 | 155 |
| C6 | 10 | 132 |
| C7 | 10 | 122 |
| CC4 | 0 | 153 |
| C8 | 5 | 129 |
| C9 | 10 | 124 |
| CC5 | 0 | 162 |

TABLE 5

Aging 16 h 750° C., exhaust gas mixture III

| | Proportion by weight of MnO$_2$ in the carrier oxide | CO T$_{50}$ [° C.] |
|---|---|---|
| C5 | 10 | 139 |
| CC3 | 0 | 161 |
| C6 | 10 | 136 |
| C7 | 10 | 142 |
| CC4 | 0 | 161 |
| C8 | 5 | 132 |
| C9 | 10 | 127 |
| CC5 | 0 | 165 | e) The NO$_2$/NO$_x$ ratio at the catalyst outlet was also measured with the cores aged for 16 hours at 650° C.

Figure 1B:
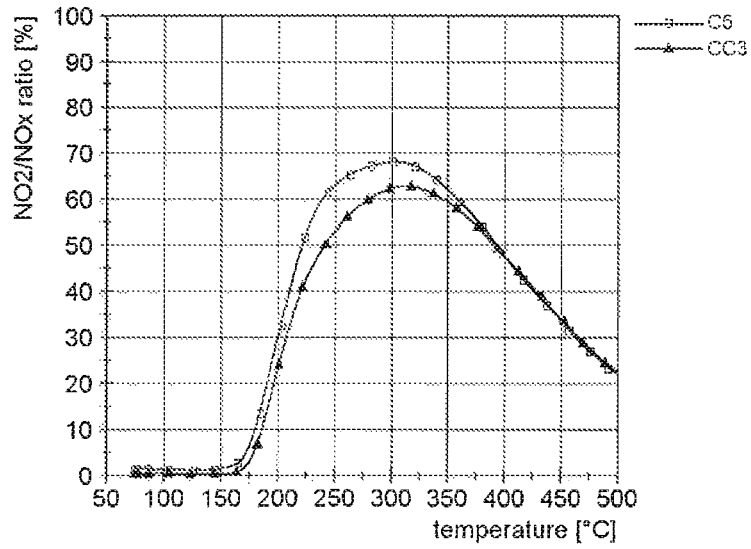
FIG. 1b shows the $NO_2/NO_x$ ratio of the C5 catalyst and the CC3 comparison catalyst measured by means of exhaust gas mixture II (6% $O_2$, 350 ppm CO, 270 ppm NO, 180 ppm $C_3H_6$, 90 ppm $C_3H_8$, 116 ppm $H_2$, 5% $H_2O$, 10.7% $CO_2$ and balance $N_2$) after aging at 650° C. for 16 hours.
Figure 2A:
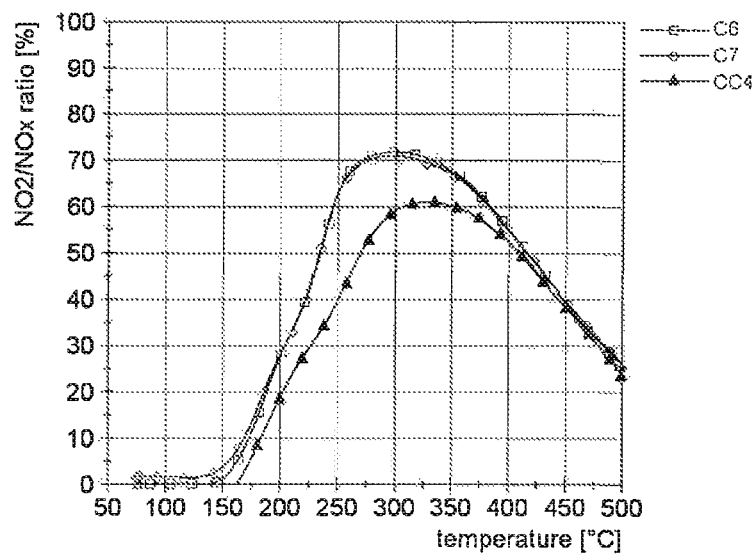
FIG. 2a shows the $NO_2/NO_x$ ratio of the C6 and C7 catalysts and the CC4 comparison catalyst measured by means of exhaust gas mixture III (10% $O_2$, 250 ppm CO, 750 ppm NO, 7.5% $H_2O$, 7% $CO_2$ and balance $N_2$) after aging at 650° C. for 16 hours.
Figure 2B:
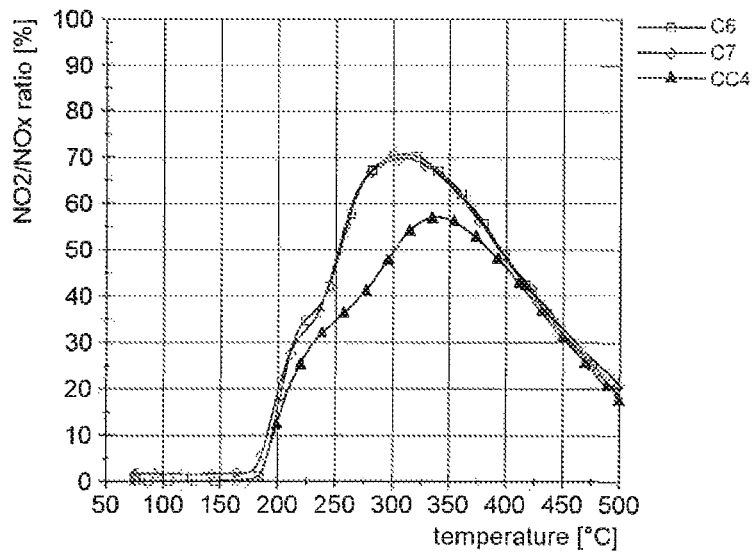
FIG. 2b shows the $NO_2/NO_x$ ratio of the C6 and C7 catalysts and the CC3 comparison catalyst measured by means of exhaust gas mixture II (6% $O_2$, 350 ppm CO, 270 ppm NO, 180 ppm $C_3H_6$, 90 ppm $C_3H_8$, 116 ppm $H_2$, 5% $H_2O$, 10.7% $CO_2$ and balance $N_2$) after aging at 650° C. for 16 hours.
Figure 3A:
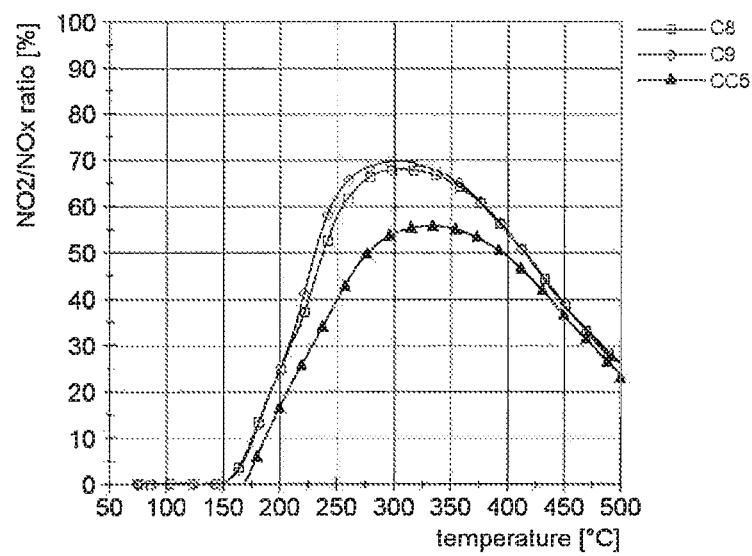
FIG. 3a shows the $NO_2/NO_x$ ratio of the C8 and C9 catalysts and the CC5 comparison catalyst measured by means of exhaust gas mixture III (10% $O_2$, 250 ppm CO, 750 ppm NO, 7.5% $H_2O$, 7% $CO_2$ and balance $N_2$) after aging at 650° C. for 16 hours.
Figure 3B:
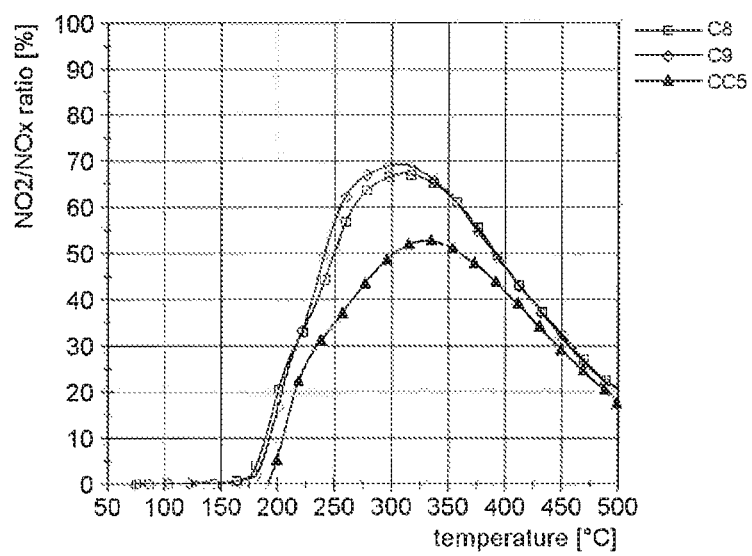
FIG. 3b shows the $NO_2/NO_x$ ratio of the C8 and C9 catalysts and the CC5 comparison catalyst measured by means of exhaust gas mixture II (6% $O_2$, 350 ppm CO, 270 ppm NO, 180 ppm $C_3H_6$, 90 ppm $C_3H_8$, 116 ppm $H_2$, 5% $H_2O$, 10.7% $CO_2$ and balance $N_2$) after aging at 650° C. for 16 hours.

The results are shown in FIGS. 1a and 1b for the catalysts C5 and CC3, FIGS. 2a and 2b for the catalysts C6, C7 and CC4, and FIGS. 3a and 3b for the catalysts C8, C9 and CC5.

The invention claimed is:

1. A diesel oxidation catalyst, which comprises a carrier body having a length L extending between a first end face a and a second end face b and a catalytically active material zone A arranged on the carrier body, wherein the material zone A contains palladium and platinum supported on a manganese-containing carrier oxide, wherein the manganese-containing carrier oxide includes a carrier oxide component A and a carrier oxide component B and the carrier oxide component B includes a manganese and/or a manganese compound and is present in an amount of 5 to 15 wt. %, calculated as MnO$_2$ and based on the total weight of the manganese-containing carrier oxide, and wherein material zone A is free of zeolites.

2. Diesel oxidation catalyst according to claim 1, wherein the carrier oxide component A is selected from the series consisting of aluminum oxide, doped aluminum oxide, silicon oxide, titanium dioxide and mixed oxides containing one or more of said oxides.

3. Diesel oxidation catalyst according to claim 1, wherein the carrier oxide component A is doped aluminum oxide.

4. Diesel oxidation catalyst according to claim 1, wherein the carrier oxide component A is a mixed oxide comprising aluminum oxide and silicon oxide or a silicon-oxide-doped aluminum oxide.

5. Diesel oxidation catalyst according to claim 1, wherein the carrier oxide component B is present in an amount of from 8 to 12 wt. %, calculated as MnO$_2$ and based on the total weight of the manganese-containing carrier oxide.

6. Diesel oxidation catalyst according to claim 1 wherein the ratio of platinum to palladium is Pt:Pd≥1.

7. Diesel oxidation catalyst according to claim 1, wherein the platinum and palladium in material zone A is supported exclusively on the manganese-containing carrier oxide.

8. Diesel oxidation catalyst according to claim 1, consisting of the carrier body and material zone A.

9. Diesel oxidation catalyst according to claim 1, further comprising material zone B.

10. Diesel oxidation catalyst according to claim 9, wherein material zone B lies directly on the carrier body and material zone A on material zone B.

11. Diesel oxidation catalyst according to claim 9 wherein material zone B comprises noble metal on a carrier oxide selected from the group consisting of aluminum oxide, doped aluminum oxide, silicon oxide, titanium dioxide and mixed oxides containing one or more of said oxides.

12. Diesel oxidation catalyst according to claim 9, wherein material zone B contains zeolite selected from the series consisting of beta zeolite, ZSM-5, zeolite Y or mixtures thereof.

13. Method for treating diesel exhaust gases, wherein the diesel exhaust gas is passed over a diesel oxidation catalyst according to claim 1.

14. A device for purifying exhaust gases from diesel engines, having a diesel oxidation catalyst according to claim 1.

15. An exhaust gas purification system comprising the diesel oxidation catalyst according to claim 1 and one or both of a diesel particulate filter and an SCR.

16. Diesel oxidation catalyst according to claim 1 wherein there is a weight ratio of X:Y:Z with X being aluminum oxide, Y being one of lanthanum oxide and silicon oxide, and Z being a manganese and/or a manganese compound, and wherein X is from 85 to 95 in weight percent; Y is from 0 to 5 in weight percent; and Z is from 5 to 10 in weight percent calculated as MnO$_2$.

17. Diesel oxidation catalyst according to claim 16 wherein Y is from 3.6 to 5 in weight percent and Z is manganese oxide of 5 to 10 in weight percent calculated as MnO$_2$.

18. Diesel oxidation catalyst according to claim 1 wherein material zone A is the sole catalytically active material zone on the diesel oxidation catalyst.

19. A diesel oxidation catalyst, which comprises a carrier body having a length L extending between a first end face a and a second end face b and a catalytically active material zone A arranged on the carrier body, wherein the material zone A contains palladium and platinum supported on a manganese-containing carrier oxide, wherein the manganese-containing carrier oxide includes a carrier oxide component A and a carrier oxide component B, and the carrier oxide component B includes a manganese and/or a manganese compound and is present in an amount of 5 to 15 wt. %, calculated as MnO2 and based on the total weight of the manganese-containing carrier oxide, and wherein material zone A extends over a material zone B supported by the carrier body, and the material zone B includes zeolite, and wherein material zone A is free of zeolites.

* * * * *